US010883659B2

(12) United States Patent
LaBerge et al.

(10) Patent No.: US 10,883,659 B2
(45) Date of Patent: Jan. 5, 2021

(54) LUBRICATION OF MACHINES USING HEAT ACTIVATED POLYMERS

(71) Applicant: U.S. Army Research Laboratory ATTN: RDRL-LOC-I, Adelphi, MD (US)

(72) Inventors: Kelsen E. LaBerge, Berea, OH (US); Stephen P. Berkebile, Havre de Grace, MD (US); Gary D. Roberts, Wadsworth, OH (US); Robert F. Handschuh, North Olmsted, OH (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 426 days.

(21) Appl. No.: 15/846,460

(22) Filed: Dec. 19, 2017

(65) Prior Publication Data
US 2019/0186691 A1    Jun. 20, 2019

(51) Int. Cl.
*F16N 39/04*      (2006.01)
*F16N 25/00*      (2006.01)
(Continued)

(52) U.S. Cl.
CPC ............... *F16N 39/04* (2013.01); *C08J 3/00* (2013.01); *C10M 107/46* (2013.01);
(Continued)

(58) Field of Classification Search
CPC . F16N 39/04; F16N 9/00; F16N 15/00; F16N 25/00; F16N 2200/12; F16N 2210/12; F16N 2210/14; F16N 2270/50; C08J 3/00; C08J 2300/22; C08J 2300/24; C10M 107/46; C10M 107/48; C10M 169/048;
(Continued)

(56) References Cited

U.S. PATENT DOCUMENTS 3,659,845 A * 5/1972 Quinton ................ A63B 22/02
482/7
3,815,960 A * 6/1974 Russ, Sr. ............... B62M 27/02
305/120

(Continued)

OTHER PUBLICATIONS

14 C.F.R. § 29.927—"Additional Tests," GPO, Jan. 1, 2002.
(Continued)

*Primary Examiner* — Michael A Riegelman
(74) *Attorney, Agent, or Firm* — Eric B. Compton (57) ABSTRACT

A lubricating system includes a machine configured to operate in a first operating state and a second operating state; and a heat activated polymer material applied to at least a part of the machine and to remain solid during the first operating state and to soften upon being heated in the second operating state to lubricate the machine. The heat activated polymer material may soften due to increased friction incurred by the machine in the second operating state. A heating element may be operatively connected to any of the machine and the heat activated polymer material. The heat activated polymer material may soften due to being heated by the heating element in the second operating state. An injector may apply the heat activated polymer material to the machine. A channel may direct a flow of the heat activated polymer material as it softens in the second operating state.

27 Claims, 10 Drawing Sheets

(51) Int. Cl.
| | |
|---|---|
| *F16N 9/00* | (2006.01) |
| *C10M 107/46* | (2006.01) |
| *C10M 107/48* | (2006.01) |
| *C10M 177/00* | (2006.01) |
| *C08J 3/00* | (2006.01) |
| *F16N 15/00* | (2006.01) |
| *C10M 169/04* | (2006.01) |
| *C10N 50/08* | (2006.01) |
| *C10N 40/02* | (2006.01) |
| *C10N 40/04* | (2006.01) |
| *C10N 50/00* | (2006.01) |

(52) U.S. Cl.
CPC ...... *C10M 107/48* (2013.01); *C10M 169/048* (2013.01); *C10M 177/00* (2013.01); *F16N 9/00* (2013.01); *F16N 15/00* (2013.01); *F16N 25/00* (2013.01); *C08J 2300/22* (2013.01); *C08J 2300/24* (2013.01); *C10M 2221/00* (2013.01); *C10M 2225/00* (2013.01); *C10N 2040/02* (2013.01); *C10N 2040/04* (2013.01); *C10N 2050/025* (2020.05); *C10N 2050/08* (2013.01); *F16N 2200/12* (2013.01); *F16N 2210/12* (2013.01); *F16N 2210/14* (2013.01); *F16N 2270/50* (2013.01)

(58) Field of Classification Search
CPC ............ C10M 177/00; C10M 2221/00; C10M 2225/00; C10N 2050/025; C10N 2040/02; C10N 2040/04; C10N 2050/08
See application file for complete search history.

(56) References Cited

U.S. PATENT DOCUMENTS

| | | | |
|---|---|---|---|
| 3,913,992 A * | 10/1975 | Scott | ................... F16C 19/548 |
| | | | 384/465 |
| 4,601,592 A | 7/1986 | Jatczak et al. | |
| 5,097,926 A | 3/1992 | Duello | |
| 5,363,821 A | 11/1994 | Rao et al. | |
| 7,651,049 B2 | 1/2010 | Carnelli et al. | |
| 7,806,598 B2 | 10/2010 | Doll et al. | |
| 8,459,413 B2 | 6/2013 | Gmirya et al. | |
| 8,507,422 B2 | 8/2013 | Price et al. | |
| 8,602,166 B2 | 12/2013 | Mullen et al. | |
| 8,951,157 B2 | 2/2015 | McGlaun et al. | |
| 2012/0141052 A1 | 6/2012 | Drew et al. | |
| 2019/0186691 A1* | 6/2019 | LaBerge | ................ F16N 17/02 |

OTHER PUBLICATIONS

R. F. Handschuh, "Thermal Behavior of Aerospace Spur Gears in Normal and Loss-of-Lubrication Conditions," presented at the American Helicopter Society's 71st Annual Forum, Virginia Beach, VA, 2015. (paper available at sti.nasa.gov).

Paper and corresponding slide presentation titled "Hybrid Gear Performance Under Loss-of-Lubrication Conditions," presented on Mar. 10, 2017 at the American Helicopter Society 73rd Annual Forum & Technology Display held Mar. 9-11, 2017 in Fort Worth, Texas. The paper was corrected from the original submitted to the conference and the corrected version is believed to have been made publically available on Jul. 17, 2017.

U.S. Appl. No. 15/846,347, filed Dec. 19, 2017.

* cited by examiner

LUBRICATION OF MACHINES USING HEAT ACTIVATED POLYMERS

GOVERNMENT INTEREST

The embodiments described herein may be manufactured, used, and/or licensed by or for the United States Government without the payment of royalties thereon.

BACKGROUND

Technical Field

The embodiments herein generally relate to lubrication techniques, and more particularly to lubricating systems for machines.

Description of the Related Art

In accordance with 14 C.F.R. § 29.927, the U.S. military requires that the drive systems (e.g., gearboxes, drivelines, etc.) of rotorcraft (e.g., helicopter, tiltrotors, etc.) maintain operation for at least 30 minutes in the event the oil supply is lost. A gearbox loss-of-lubrication event could potentially result in a loss of supplied torque. Such an event is often catastrophic, in the case of helicopters and other vertical lift vehicles that require torque to rotating blades to maintain elevation. Military vertical lift platforms that do not pass the required drive system loss-of-lubrication testing require an emergency lubrication system. These auxiliary systems include extra hardware and controls to move liquid lubricant to mechanical contacts of moving parts (e.g. gears, bearings, etc.), thus increasing the weight and complexity of the drive system and reducing the potential payload capacity.

SUMMARY

In view of the foregoing, an embodiment herein provides a lubricating system comprising a machine configured to operate in a first operating state and a second operating state; and a heat activated polymer material applied to at least a part of the machine and to remain solid during the first operating state and to soften upon being heated in the second operating state to lubricate the machine. The heat activated polymer material may soften due to increased friction incurred by the machine in the second operating state. The lubricating system may comprise a heating element operatively connected to any of the machine and the heat activated polymer material. The heat activated polymer material may soften due to being heated by the heating element in the second operating state. The lubricating system may comprise an injector to apply the heat activated polymer material to the machine. The machine may comprise any of a gear and a bearing. The lubricating system may comprise a channel to direct a flow of the heat activated polymer material as it softens in the second operating state. The heat activated polymer material may comprise any of a thermoset polymer material and a thermoplastic polymer material. The heat activated polymer material may comprise any of sulfur and phosphorous chemical compounds.

Another embodiment provides a lubricating system comprising a reservoir configured to be connected to a movable component, which is configured to operate in a primary lubricated state and a secondary lubricated state, the reservoir comprising a heat activated polymer material stored as a solid material during the primary lubricated state and is activated to flow upon being heated in the secondary lubricated state to lubricate the movable component. The heat activated polymer material may flow due to increased friction incurred by the movable component in the secondary lubricated state. The lubricating system may comprise a heating element operatively connected to any of the reservoir, the heat activated polymer material, and the movable component. The heat activated polymer material may flow due to being heated by the heating element in the secondary lubricated state. The lubricating system may comprise an injector to apply the heat activated polymer material to the movable component. The movable component may comprise any of a gear and a bearing. The lubricating system may comprise a channel to direct the heat activated polymer material as it flows onto the movable component in the secondary lubricated state. The heat activated polymer material may comprise any of a thermoset polymer material and a thermoplastic polymer material. The heat activated polymer material may comprise any of sulfur and phosphorous chemical compounds. The lubricating system may comprise multiple reservoirs arranged on one or more sides of the movable component. The heat activated polymer material may transition from a solid state to a liquid state upon being heated.

Another embodiment provides a method of lubrication comprising providing a machine; applying a heat activated polymer material to at least a part of the machine; increasing a temperature of the machine causing the heat activated polymer material to transition into a flowable material; and lubricating the at least part of the machine with the flowable heat activated polymer material. The increase in temperature of the machine may be caused by friction incurred by the machine. The method may comprise directing a flow of the heat activated polymer material on the at least a part of the machine. The heat activated polymer material may comprise any of a thermoset polymer material and a thermoplastic polymer material. The heat activated polymer material may comprise any of sulfur and phosphorous chemical compounds.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which.

DETAILED DESCRIPTION

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Machines, such as gearboxes and bearing housings, in high power applications such as aircraft depend on lubrication to reduce friction and wear and provide cooling. A technique of providing lubrication to surface contacts under oil-out conditions is desired that is unaffected by aircraft maneuvers and does not add to the complexity or incur a significant weight increase to the drive system. By providing a small amount of lubrication to surface contacts, temperature increases due to friction can be minimized, thus postponing or even avoiding thermal failures that would otherwise result in a loss of torque. The embodiments herein provide a heat activated polymer that is solid under normal operation of a machine, but flows and/or is delivered to surface contacts under adverse conditions by either passive (due to heat generated by increased friction on adjacent components) or active (due to heat from an adjacent heater or heating element) means. The heat activated polymer may be situated on the gearbox or machine housing, or on the rotating machine components. Referring now to the drawings, and more particularly to FIGS. 1A through 10, there are shown exemplary embodiments.

The embodiments herein may use either passive or active mechanisms for heating reservoirs of solid polymer materials to activate the flow of that material into machine components such as gear and bearing contacts. In an example, a passive mechanism comprises a reservoir for a polymer on a rotating machine component (e.g., gear, bearing, etc.) that softens or melts at elevated temperatures. Thereafter, centrifugal effects cause the polymer to flow radially outward to the mechanical surface contacts (e.g., gear tooth contacts, bearing contacts rolling element contacts, etc.) and provide lubrication thereto. The polymer may flow as a deformable solid or as a liquid. In one embodiment, the polymer may transition from the solid state to a liquid state.

In general, in the context of the embodiments herein, a polymer is a high molecular weight chemical structure made of repeat units of smaller molecular weight chemical structures called monomers. Polymers may be liquid, rubbery, or solid at room temperature, depending on the chemical structure. For the purpose of the embodiments herein, the polymer is a solid, plastic-like material at room temperature. The polymer in this solid form does not freely flow in its solid state. The polymer changes from a solid form to a softened form that is capable of flowing as the temperature increases above room temperature. The softened form of the polymer at elevated temperatures may be a viscous liquid, a visco-elastic solid, or a visco-plastic solid, according to various examples. Thermoplastic polymers soften on heating and can be made to flow by applying a force. Thermoset polymers do not soften sufficiently to allow flow unless the temperature is high enough to cause chemical degradation of the polymer. For the purposes of the embodiments herein, the polymer may be either a thermoplastic that softens and flows under loss of lubrication conditions or a thermoset that chemically degrades and softens to a sufficient degree to allow flow under loss of lubrication conditions.

Figure 1A:
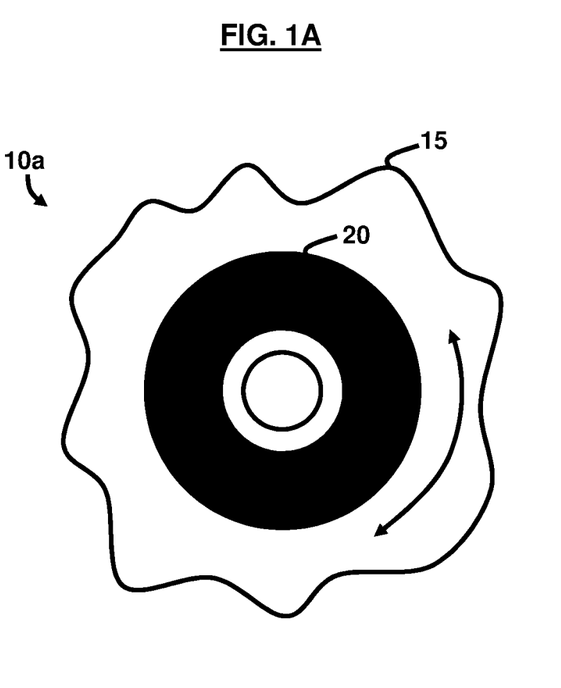
FIG. 1A is a schematic diagram illustrating a lubricating system, according to an example.
Figure 1B:
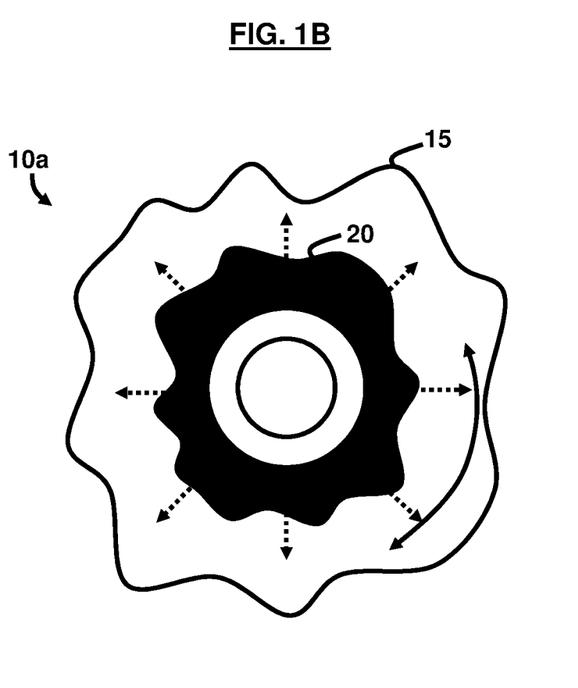
FIG. 1B is a schematic diagram illustrating an activated lubricating system, according to an example.

According to FIGS. 1A and 1B, a lubricating system 10a comprises a machine or movable component 15 configured to operate in a first operating state (e.g., primary or nominally lubricated state), shown in FIG. 1A, and a second operating state (e.g., secondary or starved lubricated state), shown in FIG. 1B. The lubricating system 10a includes a heat activated polymer material 20 applied to at least a part of the machine or movable component 15 and to remain and be stored as a solid material during the first operating state and to soften and flow upon being heated in the second operating state to lubricate the machine or movable component 15. The heat activated polymer material 20 may be stored in a reservoir 25 connected to the machine or movable component 15, in one example of the lubricating system 10b shown in FIG. 2, with reference to FIGS. 1A and 1B. The heat activated polymer material 20 may soften and flow due to frictional heating of the machine or movable component 15 in the second operating state. The machine or movable component 15 may have different forms of movement (e.g., rotation or translation) as indicated by the dotted arrows in FIG. 2 such that the movement and interaction with adjacent surfaces is capable of causing frictional heating.

Some example polymer materials 20 include MTM® 45-1 polymer matrix with a MTA® 241 film adhesive, both available from Cytec Industrial Materials Limited (Derbyshire, United Kingdom). These are epoxy-based (i.e., containing an epoxide functional group) polymers used as the matrix material in carbon fiber composite materials or as the base material in adhesive formulations. Other epoxy-based systems or alternative chemistries could be used as long as the glass transition temperature is above the temperatures encountered during normal operation of the machine or movable component 15 and below the temperatures encountered during a loss of lubrication event. Other thermoset polymers or even some thermoplastic polymers with functional side groups from lubricating oil additives may improve effectiveness of the polymer material 20. Additionally, a polymer material 20 that contains sulfur or phosphorous may be used, which have been shown to reduce wear in mating steel surfaces under harsh contact conditions when incorporated as lubricant additives in hydrocarbon molecules. Examples of some additives which may be use with the polymer material 20 include sulfur additives such as sulfurized olefins, sulfurized esters, thioethers, polysulfides; phosphorus additives, such as phosphate esters (e.g. tricresyl phosphate, tributyl phosphate, triphenyl phosphate), phosphites, phosphonates; sulfur-phosphorus additives such as phosphorothioates and (di-)thiophosphates (e.g. zinc dithiophosphate); sulfur-nitrogen additives such as dithiocarbamates, dimercaptothiadiazole; phosphorus-nitrogen additives such as amine phosphates, amine (di-)thiophosphates; and halogen additives such as esters of chlorendic acid, chlorinated alkanes, trichloromethyl phosphoric acid.

The speed of the movable component 15 and temperature range for polymer material 20 to soften and/or flow is dependent on the polymer material 20 itself and the distance from the axis of rotation of the movable component 15. In a non-limiting example, the temperature at which the polymer material 20 may begin to soften is approximately 130-200° C. In an example, conditions for the flow of the polymer material 20 to occur is approximately 10000 RPM for a polymer at approximately 1.5 inches from the axis of rotation of the movable component 15. At a larger distance from the axis of rotation the speed may be lower. Example speeds are approximately 5000-12000 RPM for distances of polymer material 20 from approximately 1-8 inches from the axis of rotation.

Figure 2:
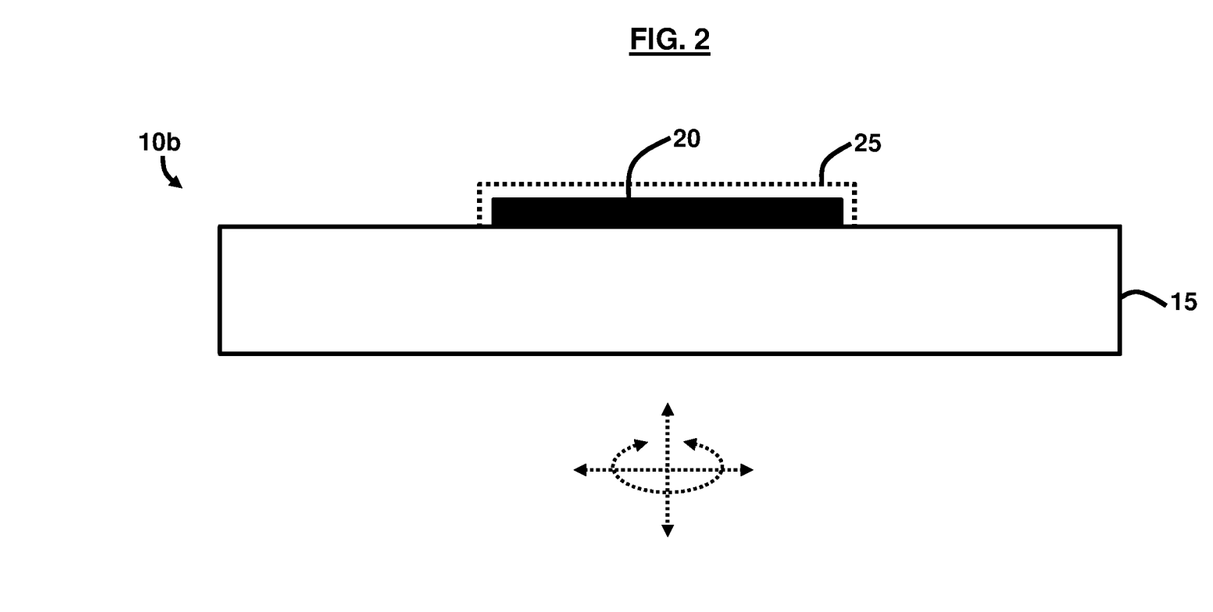
FIG. 2 is a schematic diagram illustrating a lubricating system, according to another example.
Figure 3:
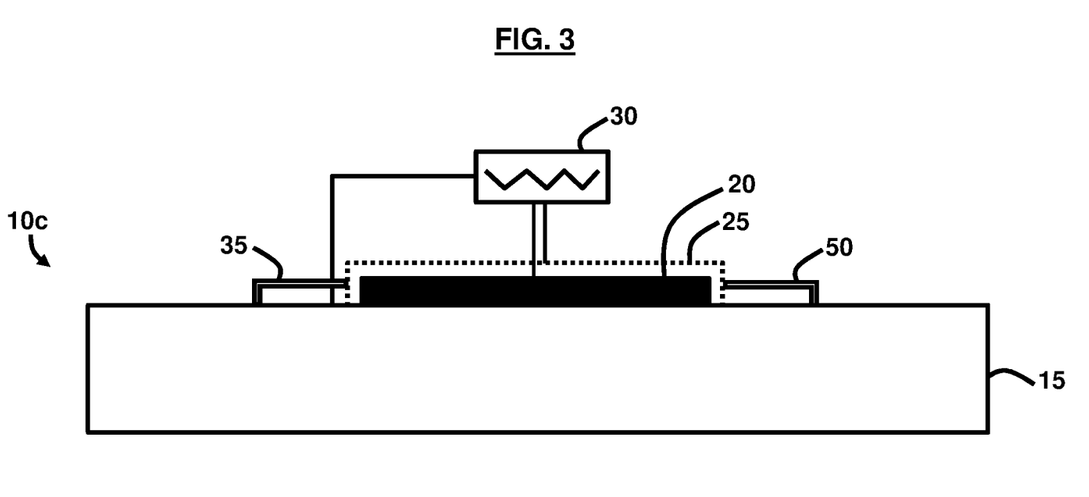
FIG. 3 is a schematic diagram illustrating a lubricating system, according to still another example.
Figure 4:
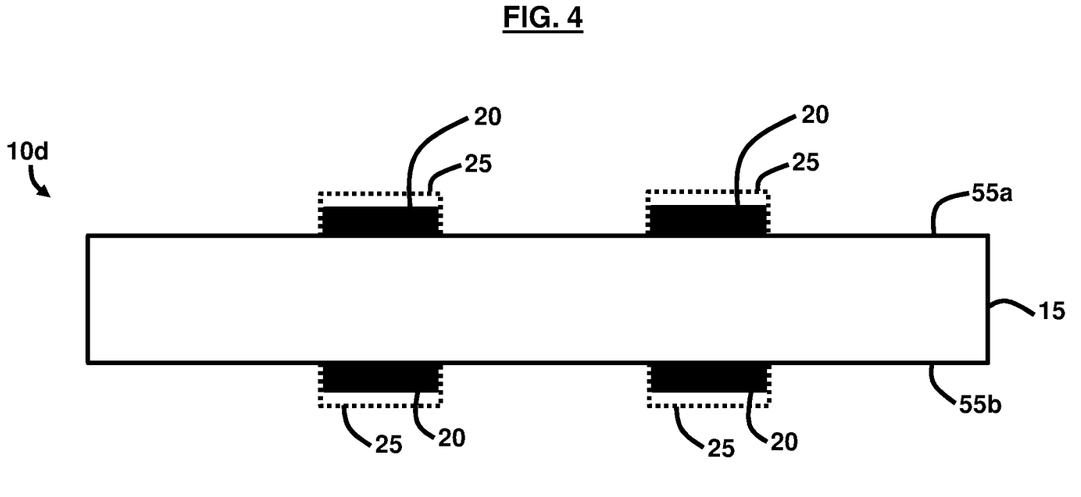
FIG. 4 is a schematic diagram illustrating a lubricating system, according to yet another example.

An example of an active or externally controlled lubricating system 10c may comprise a heater or heating element 30 operatively connected to any of the reservoir 25, the heat activated polymer material 20, and the machine or movable component 15, as shown in FIG. 3, with reference to FIGS. 1A through 2. The heat activated polymer material 20 may soften and flow due to being heated by the activated heating element 30 in the second operating state (e.g., secondary lubricated state). The lubricating system 10c may comprise an injector 35 to transport the heat activated polymer material 20 to the machine or movable component 15 and its associated mechanical rolling or sliding contacts. The machine or movable component 15 may comprise any of a gear 40 (shown in FIGS. 5A through 8B) and a bearing 45 (shown in FIGS. 9A and 9B). The lubricating system 10c may comprise a channel 50 to direct a flow of the heat activated polymer material 20 as it softens in the second operating state (e.g., starved lubrication state). The heat activated polymer material 20 may comprise any of a thermoset polymer material and a thermoplastic polymer material. The heat activated polymer material 20 may comprise any of sulfur- and phosphorous-containing chemistries. According to FIG. 4, with reference to FIGS. 1A through 3, a lubricating system 10d may comprise multiple reservoirs 25 arranged on one side 55a of the machine or movable component 15. The lubricating system 10d may also comprise multiple reservoirs 25 arranged on multiple sides 55a, 55b of the machine or movable component 15, as shown in FIG. 4.

Figure 5A:
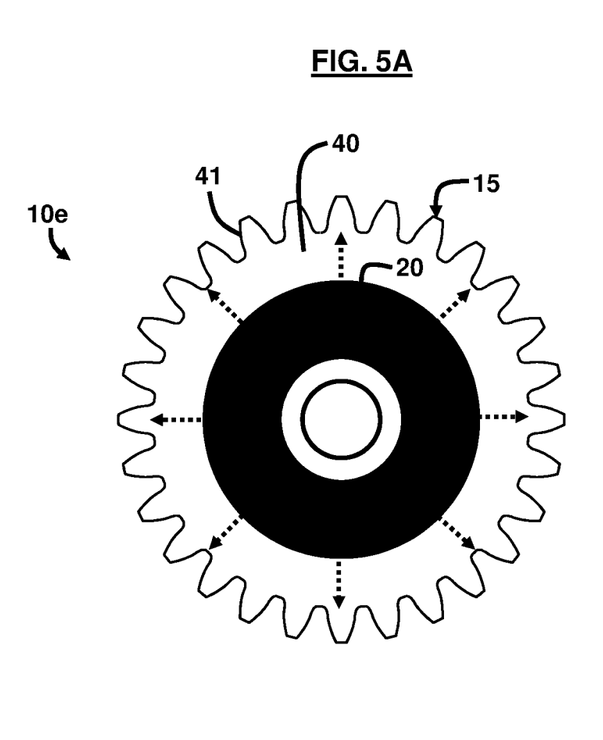
FIG. 5A is a schematic diagram illustrating a top view of a passive lubricating system on a gear, according to an example.
Figure 5B:
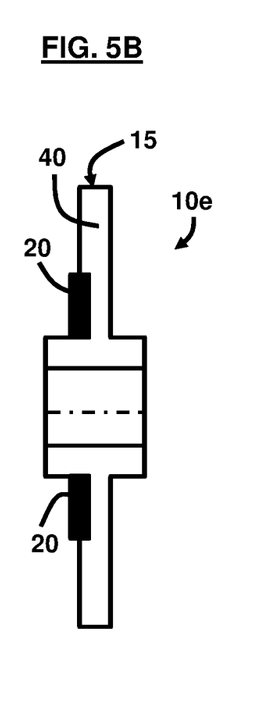
FIG. 5B is a schematic diagram illustrating a cross-sectional side view of a passive lubricating system on a gear, according to an example.
Figure 6:
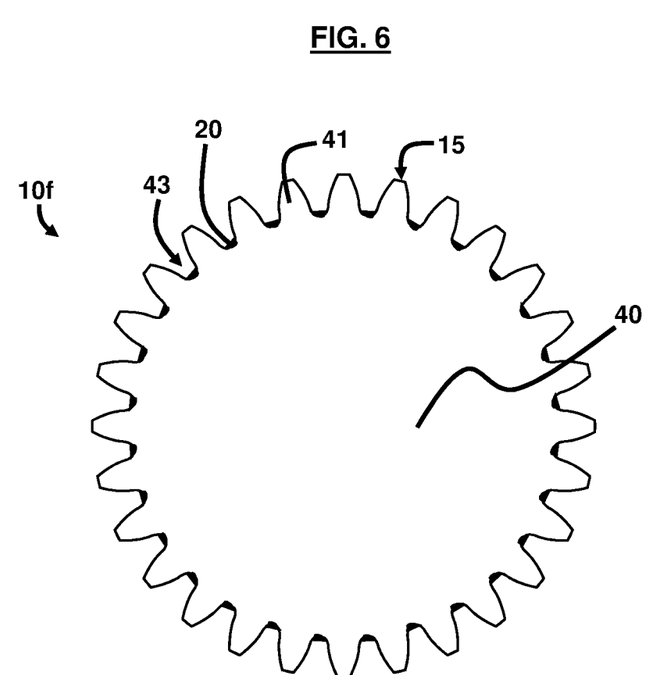
FIG. 6 is a schematic diagram illustrating a passive lubricating system on a gear, according to another example.
Figure 7A:
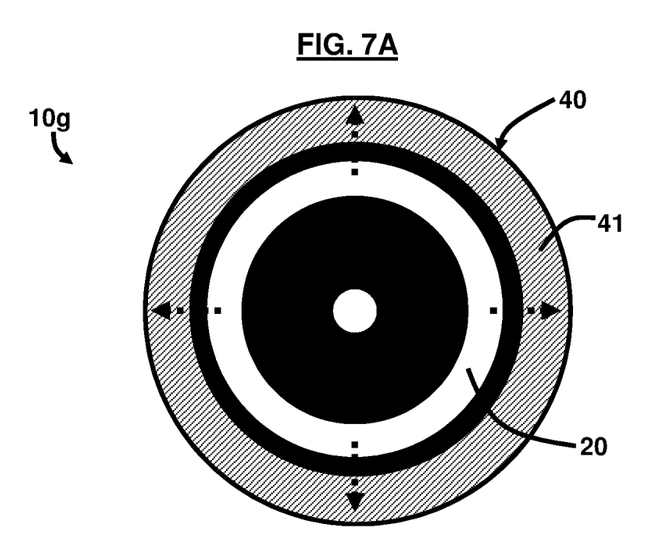
FIG. 7A is a schematic diagram illustrating an axial view of a passive lubricating system on a non-parallel axis gear, according to an example.
Figure 7B:
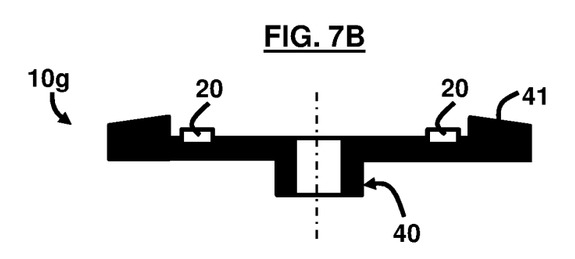
FIG. 7B is a schematic diagram illustrating a cross-sectional side view of a passive lubricating system on a non-parallel axis gear, according to an example.

According to one example, the embodiments herein may be used on gears 40, where the polymer material 20 or composite with a polymer matrix is placed on the gear 40 itself, as shown in the lubricating system 10e of FIGS. 5A and 5B, with reference to FIGS. 1A through 4. Under the absence of lubrication, the temperature of the gear 40 may increase due to the increased friction at the tooth contact 41. When the gear 40 sufficiently heats up, the polymer material 20 softens and begins to flow radially outward towards the gear teeth 41 to provide lubrication thereon. In various examples, the polymer reservoir(s) 25 may be positioned on one or both sides of the gear 40. Another example embodiment using a gear 40 is shown in the lubricating system 10f of FIG. 6, with reference to FIGS. 1A through 5B, which depicts parallel axis gears 40, where the polymer material 20 is placed in the clearance region 43 of each tooth 41. Additionally, the embodiments herein may also be utilized for non-parallel axis gears such as bevel, spiral bevel, or face gears. An example is shown in the lubricating system 10g of FIGS. 7A and 7B, with reference to FIGS. 1A through 6, where the polymer material 20 is located inside the toe of the gear 40 or along the edge of the inner diameter of the teeth 41.

Figure 8A:
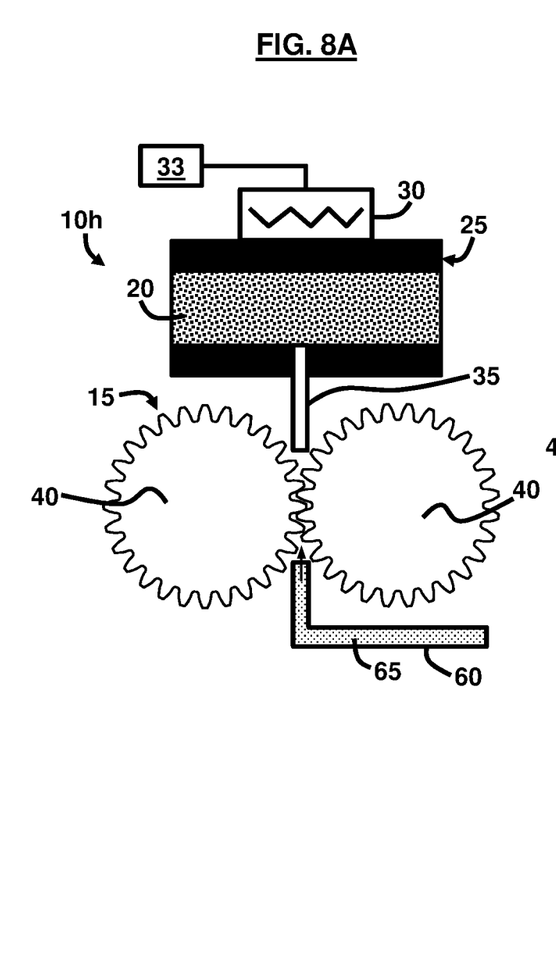
FIG. 8A is a schematic diagram illustrating a lubricating system with a primary lubricant, according to an example.
Figure 8B:
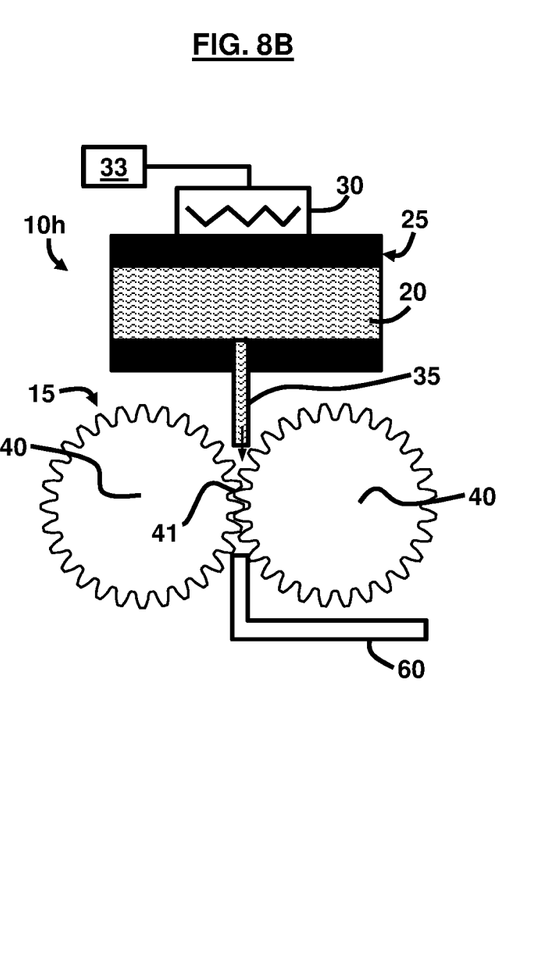
FIG. 8B is a schematic diagram illustrating a lubricating system with a depleted primary lubricant, according to an example.

An active mechanism embodiment may include heating the polymer reservoirs 25 within a gearbox or housing when needed and directing or injecting the softened polymer material 20 to sliding contacts, as is shown in the example lubricating system 10h of FIGS. 8A and 8B. This technique may be used to direct or inject the softened polymer material 20 onto the required mechanical contacts (e.g. gear contacts 41) to provide lubrication. In FIG. 8A, a primary oil supply mechanism 60 containing a lubricant 65 is provided to the machine or movable component 15. Once the supply of lubricant 65 is exhausted, as shown in FIG. 8B, a heater 30 is activated to soften the polymer material 20 and is delivered to mechanical contacts, in this case mating gear teeth 41 of a pair of mating gears 40. A heater 30 and some type of injector 35 along with associated electronics and controls 33 may be used to implement this example technique.

Figure 9A:
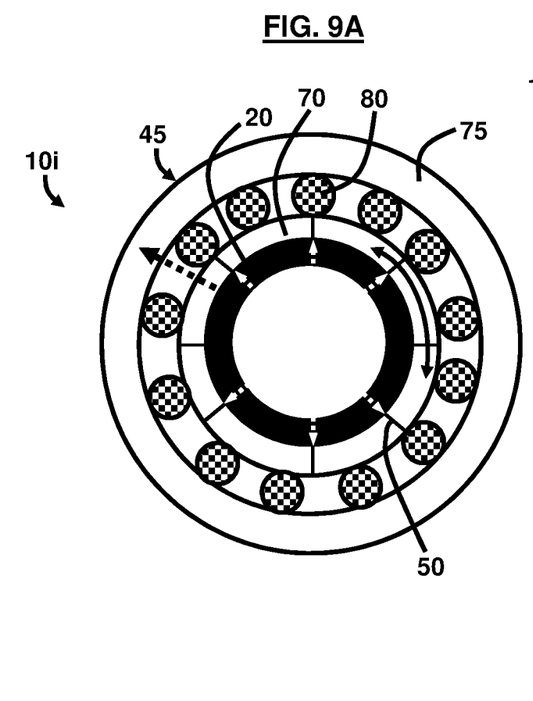
FIG. 9A is a schematic diagram illustrating an axial view of a passive lubricating system on a roller bearing, according to an example.
Figure 9B:
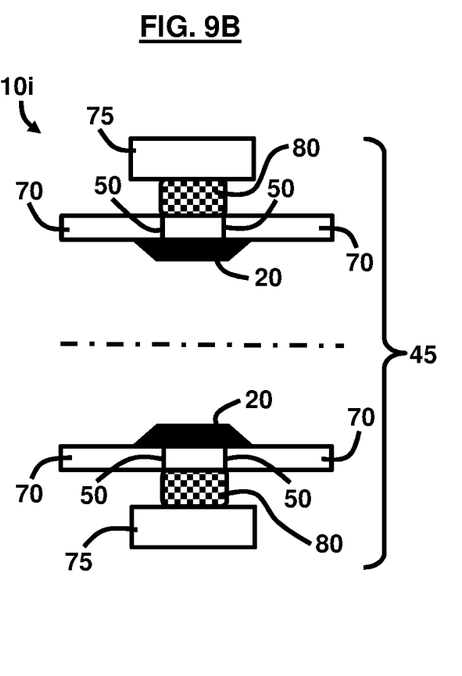
FIG. 9B is a schematic diagram illustrating a cross-sectional side view of a passive lubricating system on a roller bearing, according to an example.

While the above examples of FIGS. 5A through 8B describe and depict gears 40, the embodiments herein are applicable to bearings 45 as well, as shown in lubricating system 10i of FIGS. 9A and 9B, with reference to FIGS. 1A through 8B. For example, the internal bore of a rotating shaft 70 with rolling elements 80 may include polymer material 20 for application to the outer bearing race 75 of the bearing 45. Under the absence of a primary lubricant, the shaft or inner race 70 would increase in temperature after primary lubrication system failure and thus soften the polymer material 20. Channels 50 may be placed in the shaft 70 such that the softened polymer material 20 flows outward through the shaft or inner race 70 to lubricate the rolling elements 80 and outer race 75 of the bearing 45. This technique may be extended to bearing applications where the centerline of the inner race 70 orbits as is the case in some planet bearing applications or to other rotating applications that require lubrication (e.g. seals, bushings, journal bearings, cams, axles, joints, etc.). Additional items not described here specifically may include applications that may not be rotational in nature, but still may involve wear due to movement between mating surface contacts such as spline interfaces.

The retention of the polymer reservoirs 25 on the machine or movable component 15 as provided by the embodiments herein are not affected by movement of the machine or movable component 15; e.g., aircraft maneuvers such as aircraft pitch and roll, because the polymer material 20 remains as a solid material until increased operating temperature causes it to soften.

Figure 10:
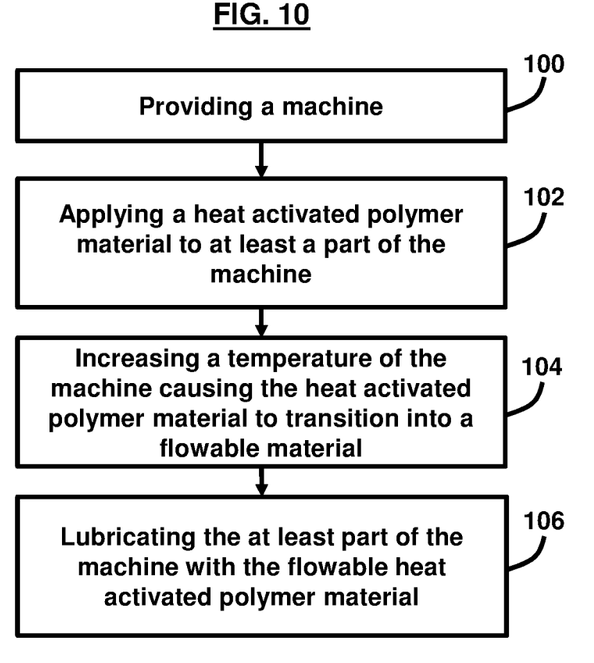
FIG. 10 is a flow diagram illustrating a method of lubrication, according to an example.

FIG. 10, with reference to FIGS. 1A through 9B, is a flow diagram illustrating a method of lubrication comprising providing (100) a machine 15; applying (102) a heat activated polymer material 20 to at least a part of the machine 15; increasing (104) a temperature of the machine 15 causing the heat activated polymer material 20 to transition into a flowable material; and lubricating (106) the at least part of the machine 15 with the flowable heat activated polymer material 20. The increase in temperature of the machine 15 may be caused by friction incurred by the machine 15. The method may comprise directing a flow of the heat activated polymer material 20 on the at least a part of the machine 15. The heat activated polymer material 20 may comprise any of a thermoset polymer material and a thermoplastic polymer material. The heat activated polymer material 20 may comprise any of sulfur and phosphorous chemical compounds.

The gearboxes in military rotorcraft are required to successfully survive 30 minutes of operation after the primary lubrication system has failed in order to be qualified. As such, rotorcraft applications may utilize the embodiments herein to support a vehicle's operation out of enemy territory in the event that a gearbox experiences such a primary lubrication system failure. The embodiments herein provide a solution with minimal increase in the total gearbox weight. Moreover, the embodiments herein may be applicable to helicopter and other rotorcraft applications as well as other vehicle platforms where a sudden loss in propulsion gearbox power could result in the loss of equipment or personnel.

While a commercial rotorcraft does not necessarily adhere to the strict requirements set forth by the military, the embodiments herein may be easily extended to include commercial helicopters and vertical lift vehicles. Accordingly, the embodiments herein offer a simple, cost-effective, and lightweight technique of increasing the survivability of a gearbox under an oil-out event. Furthermore, the embodiments herein may be applied to any gearbox, where a loss-of-oil situation would be detrimental to equipment or personnel, which could apply to a variety of both vehicle (air or ground) and non-vehicle applications.

The embodiments herein may be used on any device where increasing temperature leads to a situation requiring a passively-delivered lubricant to contacting surfaces, regardless of whether the surfaces were in contact prior to the temperature increase. The embodiments herein may be used when geometry, weight, or complexity prevent active lubrication systems or when the environment precludes the use of grease. Moreover, the embodiments herein may be used both for rapid and slow increases in temperature.

Aspects related to this invention have been previously disclosed in a paper and corresponding slide presentation titled "Hybrid Gear Performance Under Loss-of-Lubrication Conditions," presented on Mar. 10, 2017 at the American Helicopter Society 73rd Annual Forum & Technology Display held Mar. 9-11, 2017 in Fort Worth, Tex. The paper was corrected from the original submitted to the conference and the corrected version is believed to have been made publically available on Jul. 17, 2017. These documents are herein incorporated by reference in their entireties.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A lubricating system comprising:
   a machine which a primary lubricant is applied to at least one part thereof and configured to operate in a first operating state and a second operating state; and
   a secondary lubricant comprising a heat activated polymer material applied to at least a part of the machine and to remain solid during the first operating state when the primary lubricant is sufficiently applied to the at least one part of the machine and to soften upon being heated in the second operating state to lubricate the machine when the primary lubricant is insufficiently applied to the at least one part of the machine.

2. The lubricating system of claim 1, wherein the heat activated polymer material softens due to increased friction incurred by the machine in the second operating state.

3. The lubricating system of claim 1, comprising a heating element operatively connected to any of the machine and the heat activated polymer material.

4. The lubricating system of claim 3, wherein the heat activated polymer material softens due to being heated by the heating element in the second operating state.

5. The lubricating system of claim 1, comprising an injector to apply the heat activated polymer material to the machine.

6. The lubricating system of claim 1, wherein the machine comprises any of a gear and a bearing.

7. The lubricating system of claim 1, comprising a channel to direct a flow of the heat activated polymer material as it softens in the second operating state.

8. The lubricating system of claim 1, wherein the heat activated polymer material comprises any of a thermoset polymer material and a thermoplastic polymer material.

9. The lubricating system of claim 1, wherein the heat activated polymer material comprises any of sulfur and phosphorous chemical compounds.

10. The lubricating system of claim 1, wherein the primary lubricant comprises oil.

11. The lubricating system of claim 1, wherein centrifugal force of the machine applies the softened heat activated polymer material to the at least one part of the machine.

12. A lubricating system comprising a reservoir configured to be connected to a movable component, which is configured to operate in a primary lubricated state when a primary lubricant is sufficiently applied to the movable component and a secondary lubricated state when the primary lubricant is insufficiently applied to the movable component, the reservoir containing a secondary lubricant comprising a heat activated polymer material stored as a solid material during the primary lubricated state and is activated to flow upon being heated in the secondary lubricated state to lubricate the movable component.

13. The lubricating system of claim 12, wherein the heat activated polymer material flows due to increased friction incurred by the movable component in the secondary lubricated state.

14. The lubricating system of claim 12, comprising a heating element operatively connected to any of the reservoir, the heat activated polymer material, and the movable component.

15. The lubricating system of claim 14, wherein the heat activated polymer material flows due to being heated by the heating element in the secondary lubricated state.

16. The lubricating system of claim 12, comprising an injector to apply the heat activated polymer material to the movable component.

17. The lubricating system of claim 12, wherein the movable component comprises any of a gear and a bearing.

18. The lubricating system of claim 12, comprising a channel to direct the heat activated polymer material as it flows onto the movable component in the secondary lubricated state.

19. The lubricating system of claim 12, wherein the heat activated polymer material comprises any of a thermoset polymer material and a thermoplastic polymer material.

20. The lubricating system of claim 12, wherein the heat activated polymer material comprises any of sulfur and phosphorous chemical compounds.

21. The lubricating system of claim 12, comprising multiple reservoirs arranged on one or more sides of the movable component.

22. The lubricating system of claim 12, wherein the heat activated polymer material transitions from a solid state to a liquid state upon being heated.

23. A method of lubrication comprising:
provising a machine for which a primary lubricant is applied to at least one part thereof;
applying a secondary lubricant comprising a heat activated polymer material to at least a part of the machine when the primary lubricant is insufficiently applied to the at least one part of the machine;
increasing a temperature of the machine causing the heat activated polymer material to transition into a flowable material; and
lubricating the at least part of the machine with the flowable heat activated polymer material.

24. The method of claim 23, wherein the increase in temperature of the machine is caused by friction incurred by the machine.

25. The method of claim 23, comprising directing a flow of the heat activated polymer material on the at least a part of the machine.

26. The method of claim 23, wherein the heat activated polymer material comprises any of a thermoset polymer material and a thermoplastic polymer material.

27. The method of claim 23, wherein the heat activated polymer material comprises any of sulfur and phosphorous chemical compounds.

* * * * *